United States Patent
Kurylko et al.

(10) Patent No.: US 11,438,313 B2
(45) Date of Patent: Sep. 6, 2022

(54) PRIVACY FILTER FOR INTERNET-OF-THINGS (IOT) DEVICES

(71) Applicant: MASTERCARD INTERNATIONAL INCORPORATED, Purchase, NY (US)

(72) Inventors: Marek Kurylko, Bloomfield, NJ (US); Eugene Reda, Little Falls, NJ (US); Pedro Chavarria, Miami, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 299 days.

(21) Appl. No.: 16/869,204

(22) Filed: May 7, 2020

(65) Prior Publication Data

US 2021/0352050 A1  Nov. 11, 2021

(51) Int. Cl.
H04L 29/06 (2006.01)
H04L 9/40 (2022.01)
G06F 21/62 (2013.01)

(52) U.S. Cl.
CPC ...... H04L 63/0428 (2013.01); G06F 21/6245 (2013.01)

(58) Field of Classification Search
CPC .......... H04L 63/0428; G06F 21/6245
See application file for complete search history.

(56) References Cited

U.S. PATENT DOCUMENTS

| | | | |
|---|---|---|---|
| 10,388,272 B1 | 8/2019 | Thomson et al. | |
| 11,290,837 B1* | 3/2022 | Brimijoin, II | H04S 7/303 |
| 2008/0134282 A1 | 6/2008 | Fridman et al. | |
| 2017/0094018 A1* | 3/2017 | Ekström | H04W 4/70 |
| 2019/0034525 A1 | 1/2019 | McCarty et al. | |
| 2019/0043509 A1* | 2/2019 | Suppappola | G06F 3/167 |
| 2019/0147905 A1 | 5/2019 | Mai | |
| 2022/0052995 A1* | 2/2022 | Lingaiah | H04L 67/141 |

FOREIGN PATENT DOCUMENTS

CN   108231080 A   6/2018

OTHER PUBLICATIONS

Chris Champion et al. The Smart2 Speaker Blocker: An Open-Source Privacy Filter for Connected Home Speakers, Jan. 15, 2019, 9 pages, Retrieved from https://arxiv.org/pdf/1901.04879.pdf.

* cited by examiner

*Primary Examiner* — Chau Le
(74) *Attorney, Agent, or Firm* — Talem IP Law, LLP (57) ABSTRACT

A privacy filter for internet of things (IOT) devices and can include a processor, a profile resource, a device interface, an external network interface, and a storage having instructions for filtering processes and encoding processes (e.g., appropriate processes of a software development kit (SDK)). The privacy filter can receive a payload comprising audio content from a connected device; obtain filter criteria for the connected device; identify portions of the payload satisfying the filter criteria; and affect audio of the audio content corresponding to the identified portions of the payload. after affecting the audio, the privacy filter can reassemble the payload according to an IOT provider SDK and can communicate the reassembled payload to an IOT provider service.

20 Claims, 10 Drawing Sheets

PRIVACY FILTER FOR INTERNET-OF-THINGS (IOT) DEVICES

BACKGROUND

An internet-of-things (IOT) device is a hardware device that includes one or more sensors and a network interface to transmit data captured from the one or more sensors over the Internet. These devices are sometimes referred to as "smart" devices since they enable additional functionality and control as compared to how the device functions without the network connectivity. In many cases where the IOT device includes a personal digital assistant feature, a microphone is included as one of the one or more sensors. Examples of such IOT devices include Amazon Echo and Google Home. In these cases, the IOT device passively "listens" for a wake-up word and then upon detecting the wake-up word, begins recording and communicating information over the Internet via the Amazon Alexa and Google Assistant application programming interfaces to their services.

With the introduction of IOT/smart devices into the home, companies have looked to provide the highest level of intuitive solutions for consumers. In their quest to provide that degree of intuitiveness, their devices have been outfitted with numerous sensors to aggregate data (e.g., microphones, motion sensors, etc.) many of which are "always on." Some of this data—even during a time where data is intentionally being communicated over the Internet—may be more sensitive than others, including sensitive financial data, work related information and even a child's content; and users of these devices may not want this data to be captured by the companies providing the devices. Furthermore, sensors such as a microphone in the home pose a risk because with this unintended sensitive data being captured by the devices, it is possible for the sensitive data to be intercepted and used for potentially malicious purposes.

BRIEF SUMMARY

An intermediary layer between a network connected device and a network provider is provided to inhibit sensitive data from being transmitted to internet-of-things (IOT) services at a central server. This intermediary layer is referred to herein as a privacy filter.

A privacy filter for IOT devices can include a processor; a profile resource; a device interface; an external interface; and a storage having instructions stored thereon that when executed by the processor direct the privacy filter to receive, via the device interface, set-up information comprising filter criteria and any devices identified on a network; store the set-up information in the profile resource; receive, via the device interface, a payload comprising audio content; identify a source device of the payload; obtain filter criteria for the source device from the profile resource; apply the filter criteria to the payload of the source device; and communicate, via the external interface, the payload according to the filter criteria. An associated application/interface can be provided through which users can update the information, set up their desired filter criteria, and register devices and other settings.

In some cases, a privacy filter can receive a payload comprising audio content from a connected device; obtain filter criteria for the connected device; identify portions of the payload satisfying the filter criteria; affect audio of the audio content corresponding to the identified portions of the payload; reassemble the payload according to an IOT provider software development kit (SDK); and communicate the reassembled payload to an IOT provider service.

In some cases, a privacy filter can handle multiple devices on a network and apply filter criteria across the whole network as well as on a custom basis for a particular device. For example, a privacy filter can identify any devices on a network; assign a set of filter criteria for each device identified on the network; receive a payload comprising audio content; determine a source device of the payload; obtain filter criteria corresponding to the source device based on the set of filter criteria assigned to the source device; apply the filter criteria to the payload.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An intermediary layer between a network connected device and a network provider is provided to inhibit sensitive data from being transmitted to IOT services at a central server. This intermediary layer is referred to herein as a privacy filter. The privacy filter can be disposed between a modem and a connected device or incorporated at the modem or the connected device. In some cases, the privacy filter can be incorporated in a router. In some cases, the privacy filter can be in a device that is coupled to a router of a local network.

A local network, also referred to as a local area network (LAN) is a network that connects devices within a limited area such as a room, building, or group of buildings such that these devices can share a single Internet connection. A LAN generally includes a modem, a router, and a wireless access point. The modem connects the LAN to other networks (e.g., the Internet) via an Internet service provider (ISP) by converting data to a form that can be communicated over communication media such as phone lines, optical fiber, and coaxial cables. The router provides a hub for devices to connect to the modem either through wired Ethernet cables or Wi-Fi. The wireless access point provides a connection point to link wireless devices in proximity to the access point to the modem via the router (and in some cases may be part of the router). One or more of these components may be integrated in a single housing.

The privacy filter can analyze any data coming from an IOT smart device through a local network (e.g., a home Wi-Fi network) to ensure that an end point (e.g., from services provided by Apple, Google, Amazon, etc.) are not able to aggregate that data for their own purposes. Through an initial onboarding, consumers are able to establish which voices are permitted for consumption in addition to which keywords are not appropriate for routing.

Figures 1A, 1B, 1C:
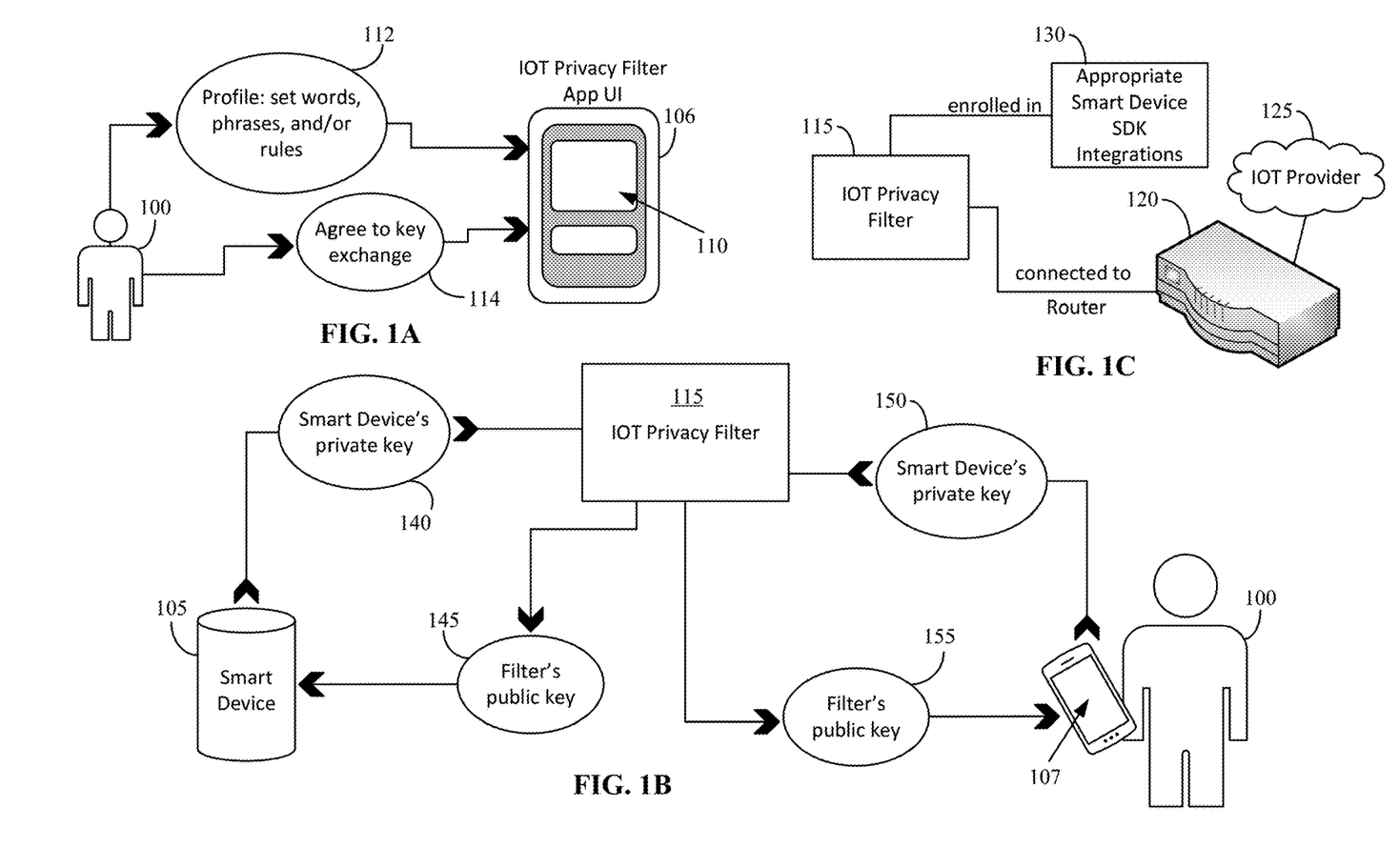
FIGS. 1A-1C illustrate a scenario for setting up a privacy filter according to an example implementation.
Figure 2:
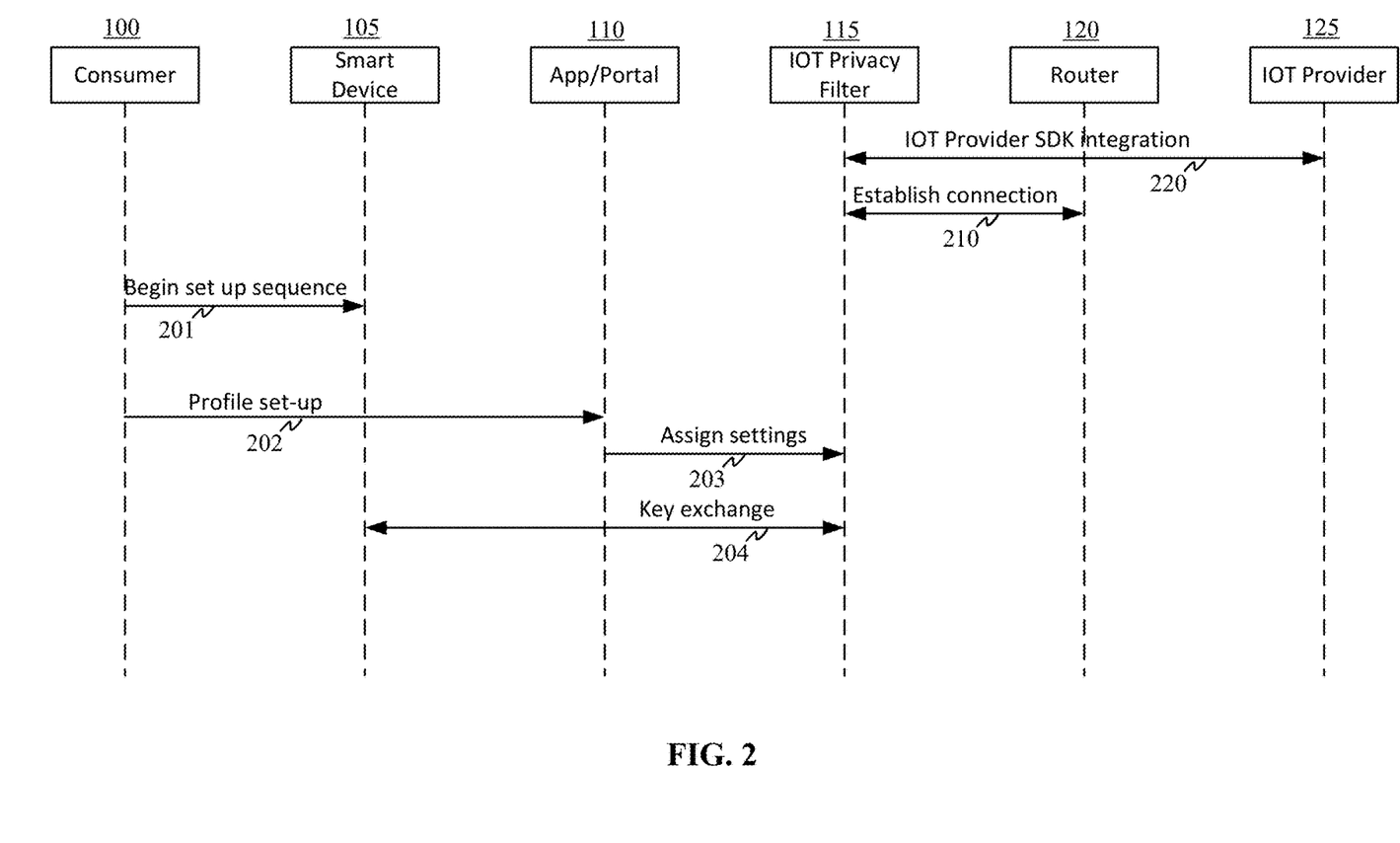
FIG. 2 illustrates a process diagram for a privacy filter set up according to an example implementation.

FIGS. 1A-1C illustrate a scenario for setting up a privacy filter according to an example implementation; and FIG. 2 illustrates a process diagram for a privacy filter set up according to an example implementation.

Referring to FIGS. 1A and 2, a consumer 100 may begin a sequence to set up (201) their smart device 105. This set up can be accomplished conventionally through, for example, an application for a digital assistant executed at a computing device 106 (e.g., mobile phone, laptop, tablet, etc.), which may be a separate device from the smart device (e.g., as computing device 106 separate from smart device 105) or the same device as the smart device (e.g., where computing device 106 is the smart device 107). When the smart device is separate from the computing device having the application for the digital assistant, the set up includes turning on the smart device; enabling communication between the smart device and the computing device on which the application for the digital assistant is executed; and authorizing connection of the smart device to the network (using, for example the application for the digital assistant). In some cases, the application for the digital assistant enables additional devices to be connected so that a command received via the smart device can cause a directive to be sent to one of the additional devices.

To set up the privacy filter for a smart device 105, an IOT privacy filter application 110 can be used to enroll/onboard users for an IOT privacy filter 115. There can be two parts for enrollment—one for the consumer (and their preferences) and the other for the particular device.

Consumer 100 can set up a profile (202) via the IOT privacy filter application 110. The interface of the IOT privacy filter application 110 may include screens through which consumer 100 agrees to terms and conditions and sets up one or more profiles with corresponding filter and word/phrase criteria 112 (e.g., "set-up information"). For example, when enrolling/onboarding, a consumer 100 may establish a profile that can include indicating the voices of each party (e.g., adults and kids in the home). The voices of each party may be captured by the device 106 for the filter application 110, and a voice analysis is performed by the filter application 110 to onboard the parties. In some cases, the filter criteria can include at least one voice sample of a voice to suppress.

The consumer 100 can input, for example via a natural language input field and/or select from a menu, keywords or types of data to filter. Examples of keywords and types of data to filter include, but are not limited to, anything identified to be in close time proximity to the words "social security," "credit card number," "medical records," etc.; any content including words such as "confidential," "top secret," "classified," "insider trading" or others (including specific numbers or words); negative phrases (e.g., forbidding pizza orders when you've input that you have a medical restriction from your doctor); and anything spoken by a child/non-onboarded individual. The application 110 communicates the settings to the IOT privacy filter 115 to assign settings (203). The IOT privacy filter 115 uses this information—the filter criteria—to inhibit that content from being passed along in payloads to an IOT provider 125. The filter criteria can be ruleset-based and/or pattern-based. That is, the filter criteria can include criteria with rules (e.g., if X, then Y; a specific sequence of numbers; key words) and criteria that looks for patterns (e.g., nine numbers in a row). For example, a ruleset can be that any numbers uttered during a period of time are suppressed (e.g., a rule at a company that during an interim period from a time that revenue numbers are calculated before release of the revenue numbers that any numbers uttered in a meeting room are suppressed).

Enrollment/onboarding further includes a key exchange (204). The user can agree to a key exchange 114 via the IOT privacy filter application 110. Then, as illustrated in FIG. 1B, the private key 140 from the smart device 105 can be provided to the IOT privacy filter 115 and the public key 145 from the IOT privacy filter 115 can be provided to the smart device 105. Similarly, when the smart device is a computing device smart device 107, the private key 150 from the computing device smart device 107 can be provided to the IOT privacy filter 115 and the public key 155 from the IOT privacy filter 115 can be provided to the computing device smart device 107.

Referring to FIGS. 1C and 2, in addition to setting up specific smart devices, the IOT privacy filter 115 is connected (210) to a router 120 (or is part of a router) and a local area network (e.g., a home Wi Fi network). The IOT privacy filter 115 acts as a proxy to the connection of any smart devices to the network. As a result, all smart devices will connect to the filter 115 which serves the same functionality as the router 120. In some cases, the filter 115 can be configured to deny all traffic to known IOT services (from one, some, or all devices on the network). The filter 115 itself is established (220) with IOT Provider software development kit (SDK) integration 130. The IOT privacy filter 115 uses the various SDKs to connect to the various IOT database endpoints (e.g., APPLE services for HOMEKIT devices, AMAZON services for Alexa enabled devices; GOOGLE for GOOGLE Assistant enabled devices). As part of the SDK integration, the IOT privacy filter 115 can be set up with appropriate communication libraries that enable packaging, encrypting, and decrypting functionality for communications with the appropriate endpoints of the IOT providers.

Figure 3:
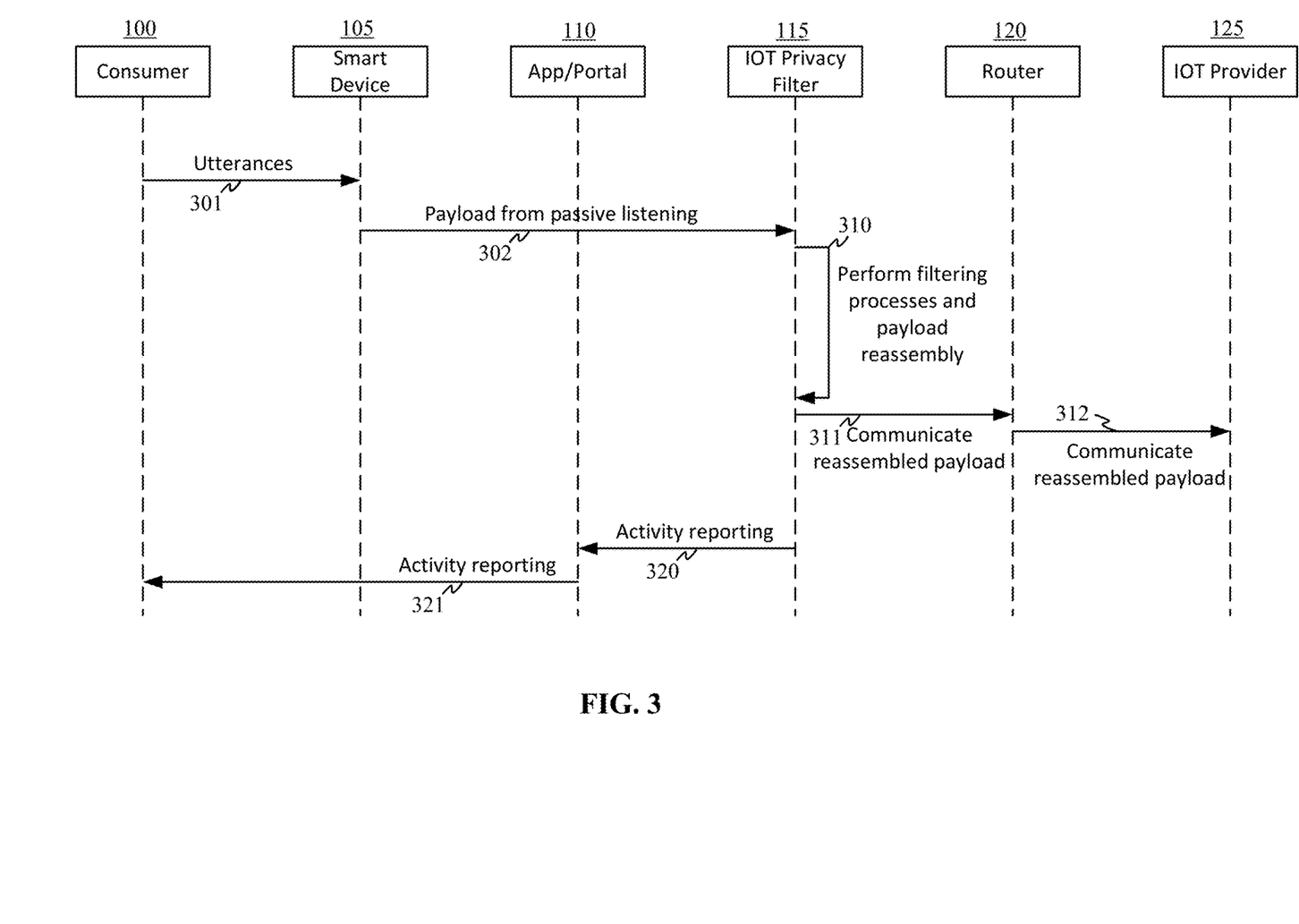
FIG. 3 illustrates a process diagram for filtering operation according to an example implementation.

FIG. 3 illustrates a process diagram for filtering operation according to an example implementation. Referring to FIG. 3, a consumer experience and data flow for filtering operation can occur once user(s) and devices have been onboarded such as described with respect to FIGS. 1A, 1B and 2. A consumer 100 may speak (301) in proximity of an IOT/smart device 105 with an 'always on' microphone. Since the IOT/smart device 105 is connected to the IOT privacy filter 115 (which serves as a router intermediary), the IOT privacy filter receives (302) the payload from the passive listening device, performs (310) filtering processes and payload reassembly, and communicates (311, 312) the reassembled payload to the router 120 and network for routing to appropriate servers (e.g., IOT Provider 125) for consumption. The communications may be according to protocols such as HTTP (hypertext transfer protocol) or MQTT (message queuing telemetry transport). As part of the processes performed at the IOT Privacy Filter 115, the payload can be analyzed to filter against blacklisted content (as set up at onboarding). Processes 310 carried out at the IOT Privacy Filter 115 can include process 400 such as described with respect to FIG. 4A and process 450 such as described with respect to FIG. 4B. In some cases, activities carried out by the IOT Privacy Filter 115 can be reported (320) to the consumer 100 via the application 110, which can display (321) reports to the consumer 100.

For a personal consumer, the IOT Privacy Filter 115 can protect the consumer from passive listening leakage (e.g., utterances spoken before a wake-up command that may be recorded and transmitted to the services) and unwanted transmission during active listening. During both passive listening and active listening, the IOT Privacy Filter 115 can prevent sharing of personally identifiable information (PII) data such as social security number, credit card number, medical related information, as well as other criteria specified as filter terms or patterns in the consumer's profile. During active listening, the IOT Privacy Filter 115 can filter phrases spoken by non-approved individuals (e.g., aggregation of any content spoken by a child) and requests pertaining to certain criteria (e.g., removing requests to order a pizza by the consumer because the consumer wants to reduce their pizza orders or preventing ordering of any non-approved goods by a child). In some cases, filtering criteria can be obtained from a third party service or be based by input from another service (e.g., prevent use when a home security service indicates the "away" alarm is set).

For an enterprise consumer, the IOT Privacy Filter 115 can support confidentiality and trade secret leakage, for example, by filtering phrases containing "Top Secret," "Confidential," "Classified," filtering phrases containing project codewords, filtering based on mention of dates (e.g., the mention of a launch date would cause payloads including that date being spoken to be suppressed or otherwise eliminated), filtering based on names (e.g., of sensitive customers), and filtering based on phrases including the term "user name" or "password."

Figure 4A:
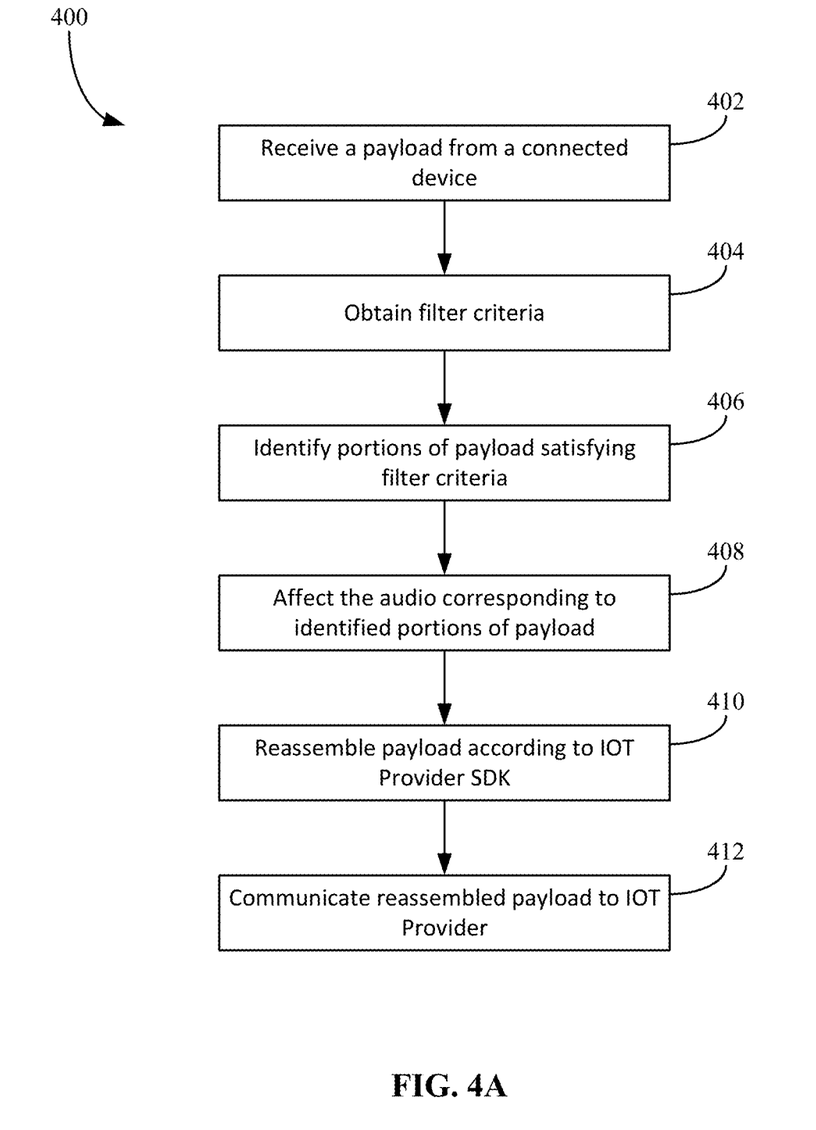
FIGS. 4A and 4B illustrate example processes performed by a privacy filter.
Figure 4B:
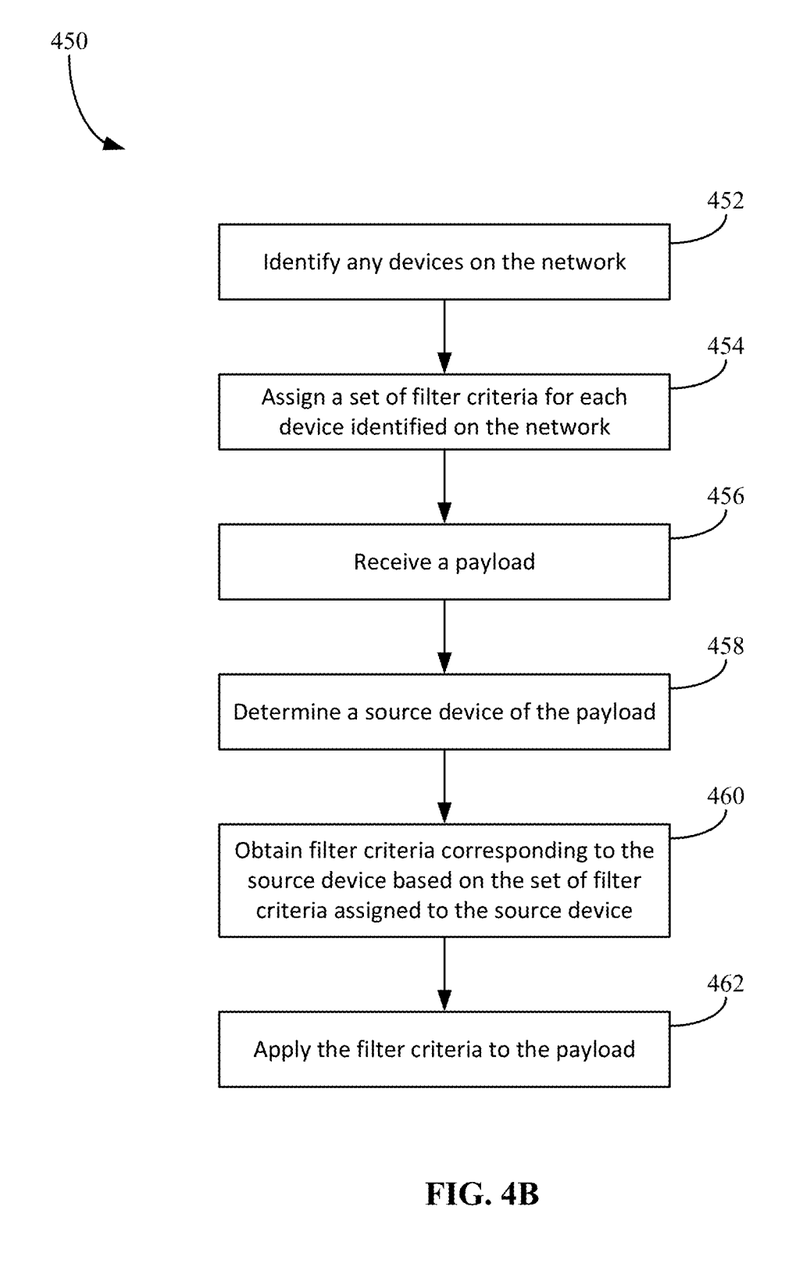

FIGS. 4A and 4B illustrate example processes performed by a privacy filter.

Referring to FIG. 4A, process 400 at an IOT privacy filter can include receiving (402) a payload from a connected device. The payload is the package that a connected device would send to the associated services and can include audio content. Often, this payload is generated by a communication library at the connected device and is in a known format (since the ALEXA, GOOGLE, and APPLE SDKs are publicly available to developer community The IOT privacy filter can obtain (404) filter criteria. The filter criteria can be based on the profiles created by consumer 100 of FIGS. 1A, 1B, and 2. For example, the filter criteria can be ruleset-based and/or pattern-based. That is, the filter criteria can include criteria with rules (e.g., if X, then Y; a specific sequence of numbers; key words) and criteria that looks for patterns (e.g., nine numbers in a row). In some cases, such as described with respect to FIG. 7, the filter criteria can also be device specific. Then, using the filter criteria, the IOT privacy filter identifies (406) portions of the payload satisfying the filter criteria. Since the IOT privacy filter includes the SDK integration (as described in step 220 of FIG. 2), the IOT privacy filter can use the appropriate libraries to decrypt the payload as a preliminary step before operation 406.

In some cases, in order to identify portions of the payload satisfying the filter criteria, the IOT privacy filter applies a speech-to-text (STT) technology to convert the audio to text and then focuses on time slices of the payload in which key words (or particular patterns indicated by the criteria) are detected to identify time slices that satisfy the criteria. An example is provided with respect to FIGS. 5A-5C.

The IOT privacy filter affects (408) the audio corresponding to the identified portions of the payload. Instead of discarding the entire message/recording of the payload with the portions satisfying the filtering criteria, the privacy filter modulates the recording to scrub the sensitive or filter-matching component. In some cases, the IOT privacy filter performs Fourier analysis and/or synthesis to identify component frequencies in the time slice containing the identified portion and dampen the frequency components identified in the identified portion. Once the audio corresponding to the identified portions of the payload is affected, the IOT privacy filter reassembles (410) the payload according to the IOT provider SDK. The reassembly of the payload can be an encoding and encryption step or other process that arranges the message in appropriate format.

In this manner, any payloads with restricted content are not passed along to router without affecting the audio/data. The IOT privacy filter then communicates (412) the payload to the IOT provider via the router, which routes the payload to appropriate IOT servers tied to the SDKs associated with the connected device from which the payload was received.

Data which is passed to IOT provider will not contain blacklisted content which was setup by the users at time of onboarding (and which can be updated by the consumer at their request).

As previously mentioned, multiple IOT devices may be connected to a network. An IOT privacy filter can, in some cases, apply different criteria depending on the device.

Figure 7:
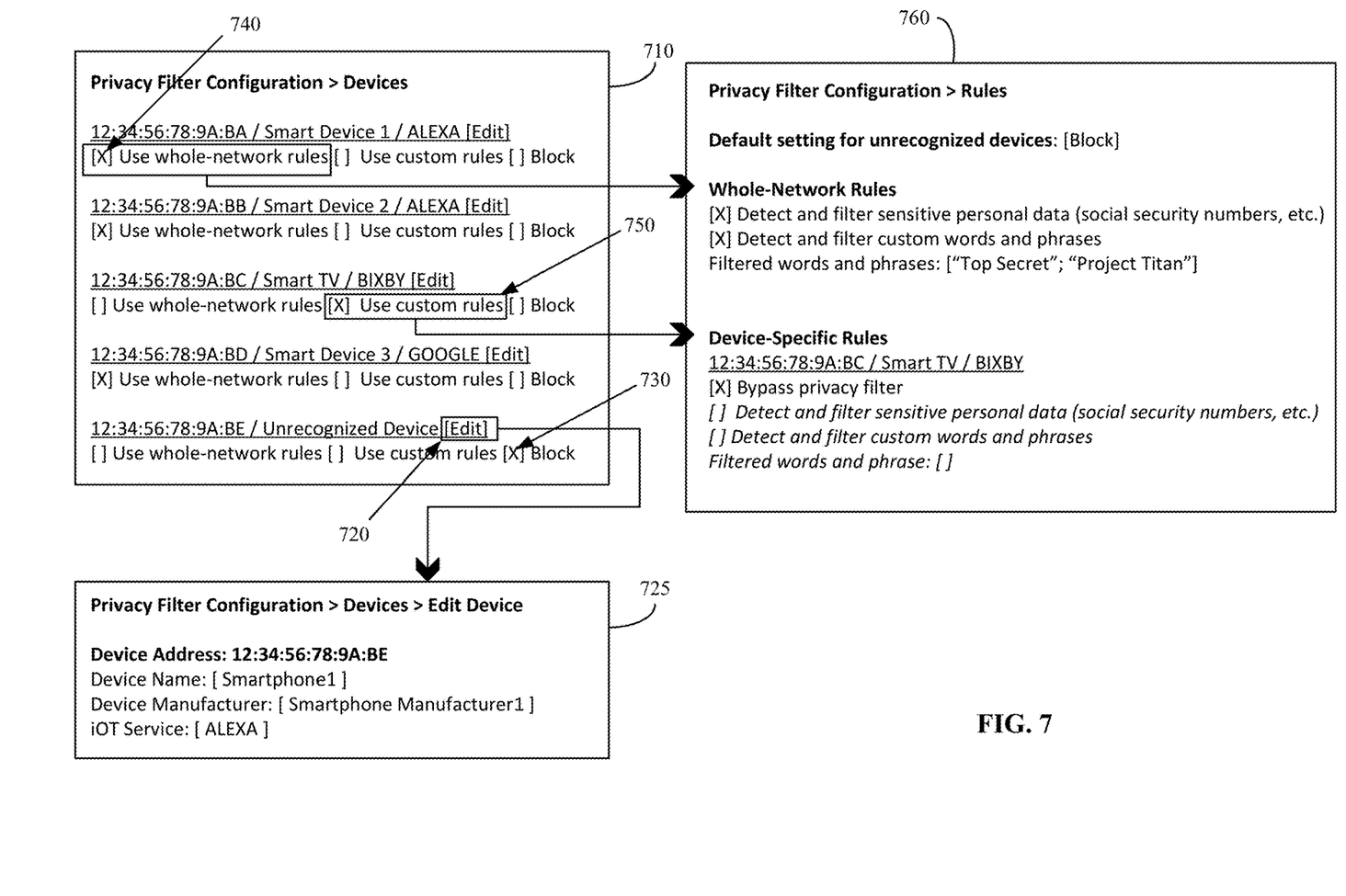
FIG. 7 illustrates a configuration of devices and rules that may be used by a privacy filter.

Referring to FIG. 4B, an IOT privacy filter can perform process 450, which includes identifying any devices on the network (452); and assigning a set of filter criteria for each device identified on the network (454). The set of filter criteria may be assigned such as illustrated in FIG. 7 and may include criteria such as described with respect to the profiles created by consumer 100 of FIGS. 1A, 1B, and 2. A payload can be received (456) by the privacy filter and the source of the payload determined (458). The source device may be any device on the network including those identified during operation 452. The privacy filter can obtain (460) filter criteria corresponding to the source device based on the set of filter criteria that were assigned; and applies (462) the filter criteria to the payload. The filter criteria can be applied to the payload by identifying portions of the payload satisfying the filter criteria and affecting the audio corresponding to the identified portions of the payload as described with respect to operations 406 and 408 of FIG. 4A. When the filter criteria include affecting the audio corresponding to identified portions of the payload, the payload may be reassembled and communicated to an IOT provider such as described with respect to operations 410 and 412 of FIG. 4A.

Figure 5A:
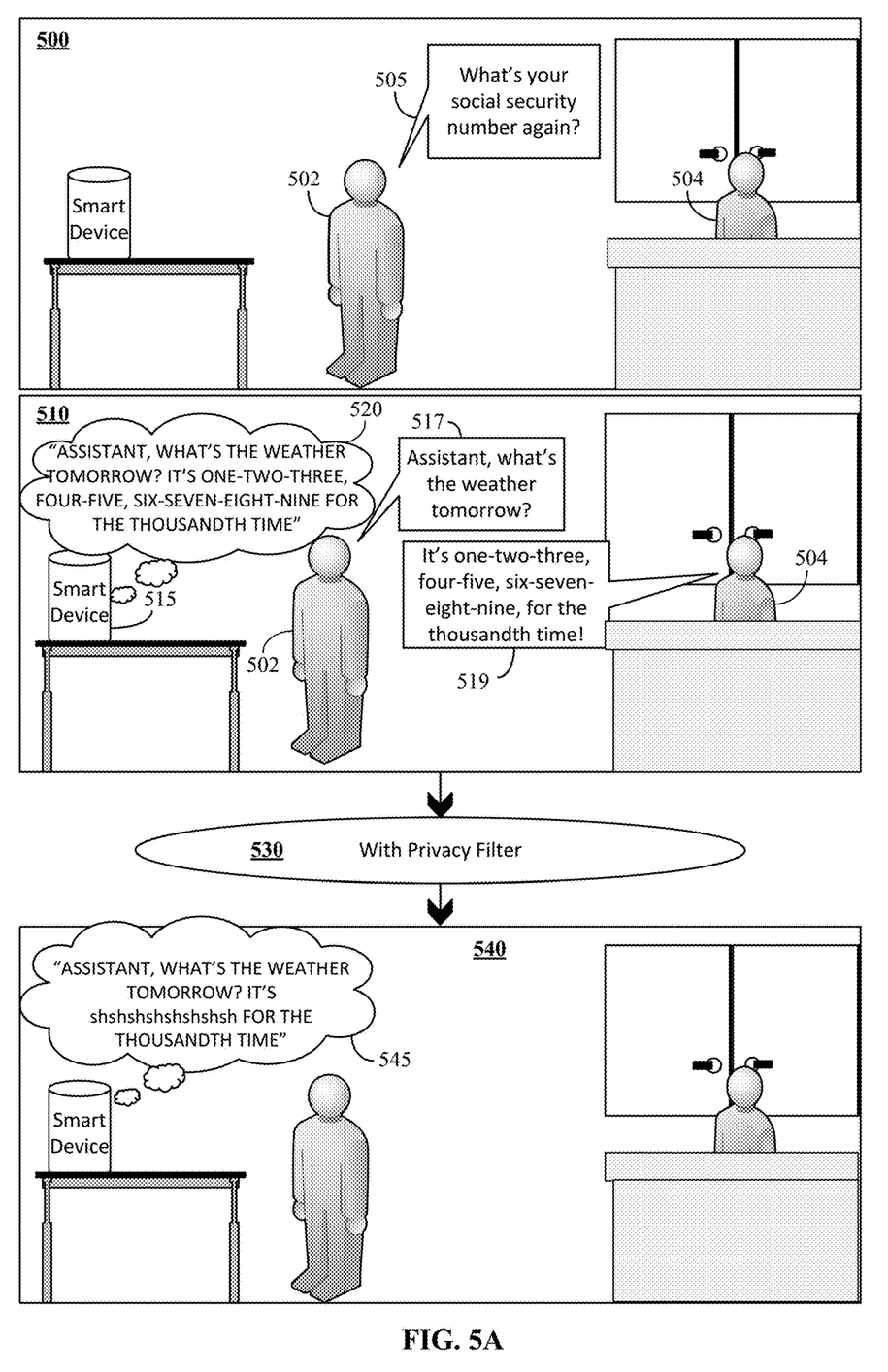
FIG. 5A illustrates a use case of an active listening, single device.
Figure 5B:
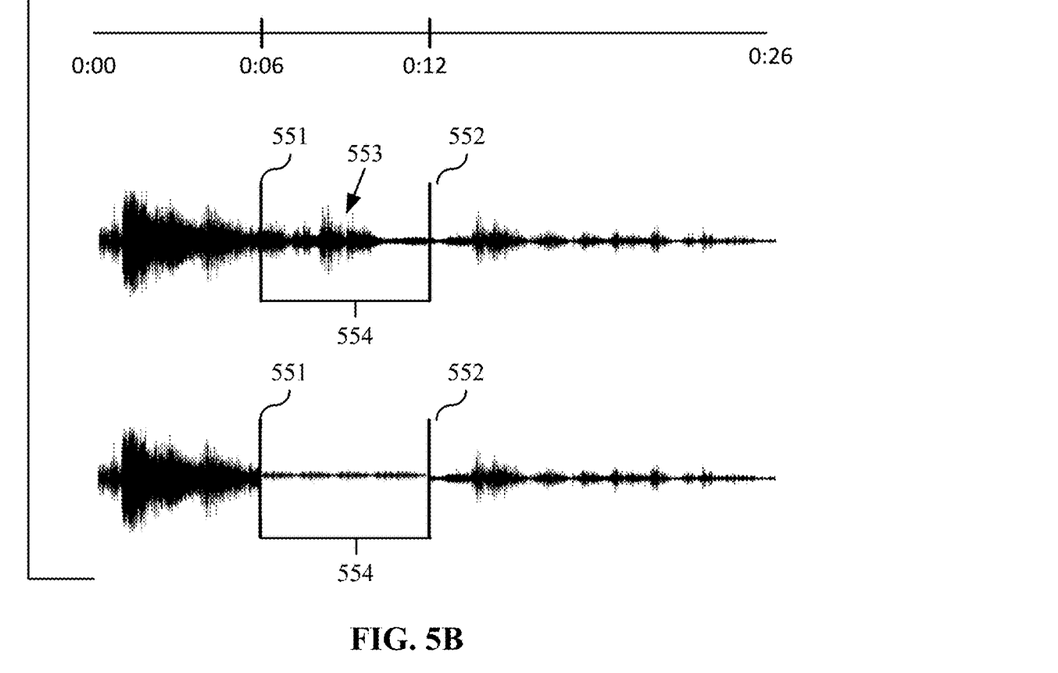
FIGS. 5B and 5C illustrate effects of privacy filtering.
Figure 5C:
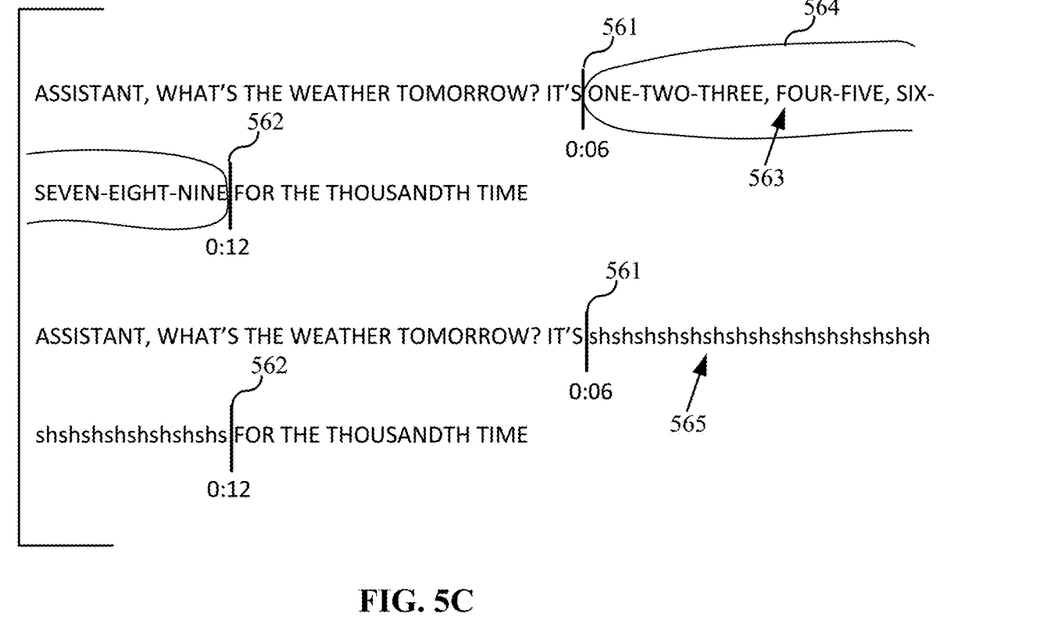

FIG. 5A illustrates a use case of an active listening, single device; and FIGS. 5B and 5C illustrate effects of privacy filtering.

Referring to FIG. 5A, the first panel 500 illustrates a scene where a first character 502 asks a second character 504 the question 505 "What's your social security number again?" The scenario continues in the second panel 510, in which the first character 502 then turns to a smart device 515 in the room and asks the question 517 "Assistant, what's the weather tomorrow?" and the second character 504 responds to the first character 502 regarding the question 505 with response 519 "It's one-two-three, four-five, six-seven-eight-nine, for the thousandth time!" Because the smart device 515 starts recording from the wake word "Assistant," the smart device captures both the question 517 and the response 519 as a payload 520. With the privacy filter 530, which can perform process 400 as described with respect to FIG. 4A, the scenario results in the third panel 540. As illustrated in the third panel 540, the resulting data 545 sent to the IOT provider service includes a silent (or nearly silent) section instead of the numbers having a pattern of a social security number. This helps avoid the inadvertent inclusion of confidential information in the request sent over the Internet.

Referring to FIGS. 5B and 5C, the mechanism that the privacy filter uses to affect the audio corresponding to the identified portions of the payload can be at an audio basis or at a converted to text basis.

The privacy filter can break apart the recording into its constituent components and run an analysis against the filter criteria. In this case, the privacy filter may perform a sliding window analysis to determine whether there is a section that fits the pattern of a social security number or other definitions of confidential information. The start and end points of the recording that contain the content fitting the pattern of the definition can be identified and that section silenced. In the illustrated examples of FIGS. 5B and 5C, the privacy filter may identify that a section of the recording from 6 seconds to 12 seconds satisfy a definition of a social security number. The identification may be performed after converting the audio from speech to text (and the analysis performed on the text of the STT file with the converted speech). In some cases, the analysis may be conducted directly on the audio.

In the example illustrated in FIG. 5B, after the corresponding start point 551 and end point 552 (in time) are identified on the audio file (either because analysis is conducted on the audio file itself or because the start and end points were identified from the STT file), the audio 553 in the section 554 between the start point 551 and end point 552 can be affected. Here, the audio may be subject to a Fourier synthesis to suppress the amplitude of the frequency components in the section 554 such as described in operation 408 of FIG. 4A.

In the example illustrated in FIG. 5C, after a start point 561 and end point 562 are identified in the STT file, the text 563 in the section 564 between the start point 561 and end point 562 can be replaced with a section 565 of the same amount of time of noise or silence.

In any case, based on the time code in the recording where any identified component begins and ends, the filter process can reduce the volume of that part down to zero (or nearly zero). Thus, instead of snipping out the section or blocking the whole package, the sensitive areas are just masked. This masking (instead of cutting) minimizes potential adverse impacts of the removal such as inadvertent interpretations of a sentence formed by concatenating two parts together without the break in time.

Figure 6:
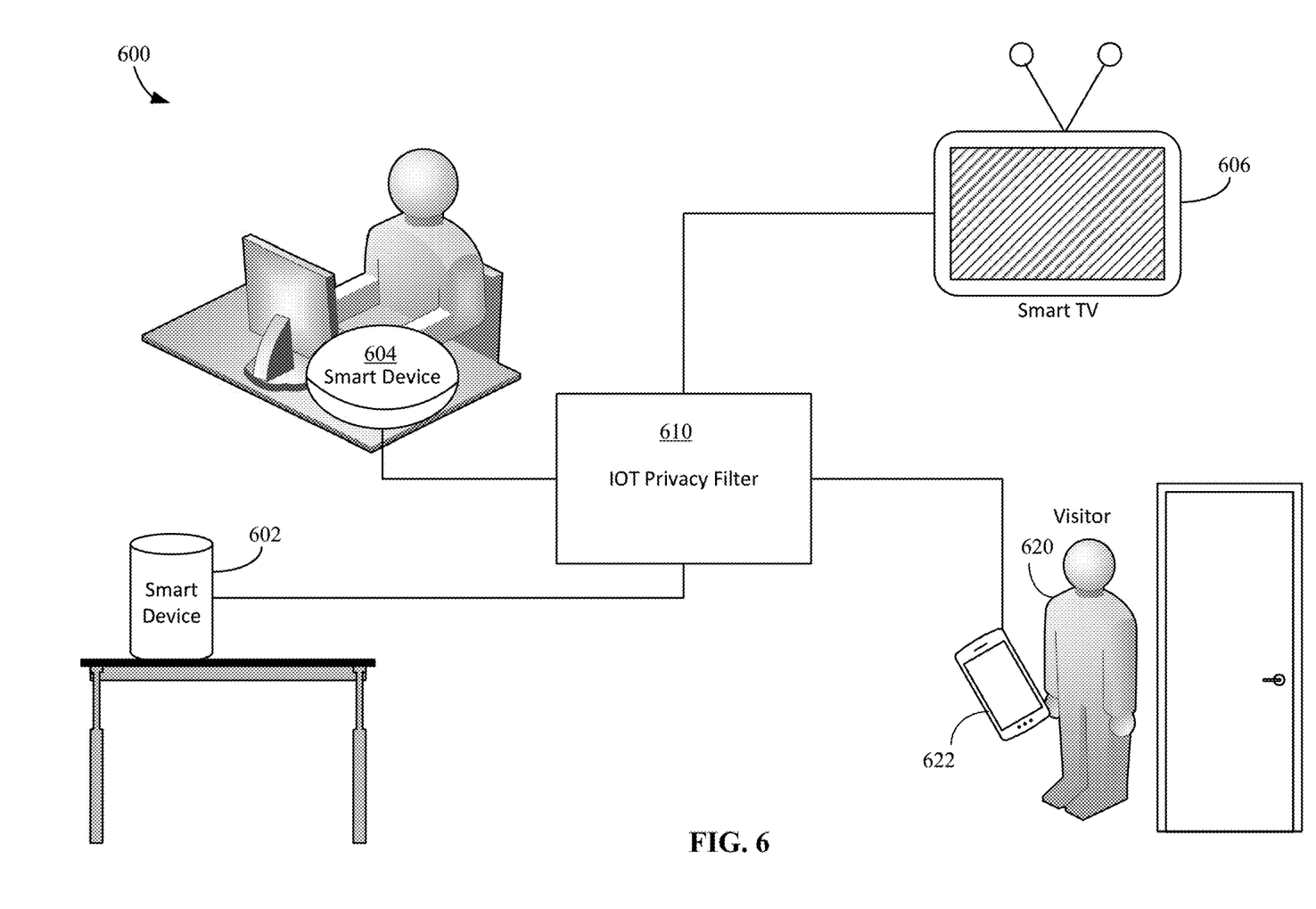
FIG. 6 illustrates a use case of multiple devices on a network.

FIG. 6 illustrates a use case of multiple devices on a network; and FIG. 7 illustrates a configuration of devices and rules that may be used by a privacy filter.

Referring to FIG. 6, a consumer scenario 600 can include multiple connected devices, such as a first smart device 602, a second smart device 604, and a smart tv 606, on a network coupled to an IOT Privacy Filter 610. A visitor 620 may connect their computing device 622 to the consumer's network to minimize their consumption of their cellular data plan. The connection to the consumer's network can result in a coupling to the IOT Privacy Filter 610, which can run the filter rules as illustrated in FIG. 7.

Turning to FIG. 7, a user may configure the rules across their entire network as well as for specific devices. Settings may be auto-detected or auto-filled from a device database. Here, a first menu 710, which may be available through an application such as IOT privacy filter application 110 described with respect to FIGS. 1A and 2, shows a privacy filter configuration of devices. In this example interface, a box can be checked for each device identified on the network by the privacy filter. In some cases, a default setting can apply for any device on the network. Devices may be recognized on the network, for example, via a MAC address. Through such an interface, it is possible to apply rules both globally to any device that is on the network as well as to specific devices.

The first and second smart devices (e.g., devices 602, 604), labeled smart device 1 and smart device 2, are identified as devices that use AMAZON ALEXA; the smart tv (e.g., smart tv 606) is identified as a device that uses the SAMSUNG BIXBY services; a third smart device is identified as using GOOGLE ASSISTANT; and an unrecognized device is identified on the network by the privacy filter device. This unrecognized device may be the computing device 622.

The user may update the device information, for example via the edit device option 720 and corresponding window 725. In some cases, the device information can be auto-detected or auto-filled. In the illustrated example, the default setting for unrecognized devices is to block 730 the device from any IOT service. This can prevent a visitor 620 from inadvertently (or on purpose) bringing a device that may pick up content. In some cases, the blocking can be accomplished by blocking all traffic (e.g., a total block setting) to known AMAZON ALEXA servers and GOOGLE HOME servers and SAMSUNG BIXBY servers, except for any devices that have specifically been configured for the IOT privacy filter. In some cases, the blocking may be to block all communications to the outside of the network.

The edit device option 720 enables a user to configure a connected device that may or may not have been recognized on the network. The identification of the connected device enables a key exchange operation to occur (e.g., operation 204 of FIG. 2).

Returning to the first menu 710, it can be seen that the first device has the network rules 740 assigned and the smart tv has custom rules 750 assigned. In the illustrated scenario, a second menu 760 is provided to enable selection of default, whole-network, and device-specific rules. Custom rules for specific devices can be applied to enable more or fewer restrictions than the rules set for the whole network. In the illustrated case, a bypass of the filter is shown. This would allow all content to be sent to the IOT provider from that device. Although not illustrated, it is possible to indicate voice detection as well as words, phrases, and patterns. In addition, although not illustrated, a consumer may select to have a particular code word that is used to identify to the privacy filter that anything following (e.g., subsequent utterances) the code word for a certain amount of time or until a second code word is uttered is to be suppressed. For example, the consumer may use "Top Secret" as a code word so that anything said after that for a period of time is suppressed and not just the phrase "Top Secret" is suppressed. This may cause an entire package to either be discarded or suppressed.

Figure 8:
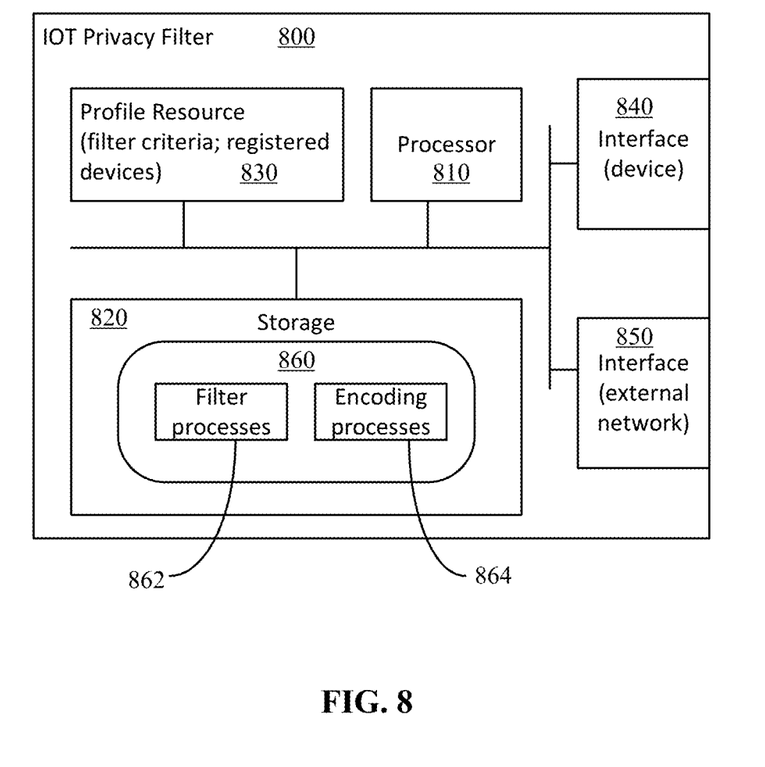
FIG. 8 illustrates components of an example IOT privacy filter.

FIG. 8 illustrates components of an example IOT privacy filter. Referring to FIG. 8, an IOT privacy filter 800 can include at least one processor 810; one or more storage resources including storage 820 and profile resource 830 (which can store filter criteria and registered devices); and one or more communications interfaces including device interface 840 and external interface 850 (e.g., an external network interface). One or more of the components of IOT privacy filter 800 may be implemented together as a system-on-chip (SoC).

The at least one processor 810 can include a central processing unit (CPU), a graphics processing unit (GPU), an application specific processor, and logic devices, as well as any other type of processing device, combinations, or variations thereof.

The one or more storage resources can include volatile and nonvolatile memories, removable and non-removable media implemented in any method or technology for storage of information, such as computer readable instructions, data structures, program modules, or other data. Examples of storage resources include storage devices in the form of random access memory, read only memory, magnetic disks, optical disks, CDs, DVDs, flash memory, magnetic cassettes, magnetic tape, magnetic disk storage or other magnetic storage devices, or any other suitable storage media. In no case is a storage resource implementing the storage 820 and the profile resource 830 a transitory propagated signal. The storage 820 and profile resource 830 may be separate storage devices or embodied on a same device. In addition, the storage 820 and profile resource 830 may each be implemented as a single storage device or may each be implemented across multiple storage devices or sub-systems co-located or distributed relative to each other.

Storage 820 can store instructions 860 for the processes carried out by the IOT privacy filter 800, including filter processes 862 (including STT functionality when used) and encoding processes 864 (e.g., for unpackaging and repackaging payloads according to a SDK) such as described with respect to process 310 of FIG. 3, process 400 of FIG. 4A, and process 450 of FIG. 4B.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

In some cases, certain aspects of the functionality and processes may be performed by one or more services (e.g., cloud services) that the privacy filter communicates with to perform said services (e.g., a speech-to-text service). In such cases, a consumer may be given the option for using cloud services for increased accuracy or for increased control and security that the IOT privacy filter or a networked enterprise server can be used. Of course, any processing performed off-device would be expected to be handling non-confidential data and/or avoid storing the data the user desires to be kept private. In addition, security considerations would be expected to be applied.

Profile resource 830 can store filter criteria and profiles such as described with respect to step 202 of FIG. 2 and filter rules illustrated in FIG. 7.

Device interface 840 supports communications from smart devices on the network via a wireless access point or wired network connection; and external network interface 850 supports communications with the external network via a modem (and routers).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A privacy filter for internet-of-things (JOT) devices, comprising:
   a processor;
   a profile resource;
   a device interface;
   an external interface; and
   a storage having instructions stored thereon that when executed by the processor direct the privacy filter to:
      receive, via the device interface, set-up information comprising filter criteria and any devices identified on a network;
      store the set-up information in the profile resource;
      receive, via the device interface, a payload comprising audio content;
      identify a source device of the payload;
      obtain filter criteria for the source device from the profile resource;
      apply the filter criteria to the payload of the source device; and
      communicate, via the external interface, the payload according to the filter criteria.

2. The privacy filter of claim 1, further comprising instructions stored in the storage that direct the privacy filter to exchange keys with a specified device of the any devices identified on the network.

3. The privacy filter of claim 1, wherein the instructions to apply the filter criteria to the payload of the source device direct the privacy filter to:
   identify portions of the payload satisfying the filter criteria; and
   affect audio of the audio content corresponding to the identified portions of the payload.

4. The privacy filter of claim 1, wherein the filter criteria comprise a code word for silencing subsequent utterances.

5. The privacy filter of claim 1, wherein the filter criteria comprise a word or phrase.

6. The privacy filter of claim 1, wherein the filter criteria comprise personally identifiable information (PII) data.

7. The privacy filter of claim 1, wherein the filter criteria comprise at least one voice sample of a voice to suppress.

8. The privacy filter of claim 1, wherein the filter criteria comprise a total block setting that blocks a connected device from communicating to an IOT provider service.

9. A method comprising:
   receiving a payload comprising audio content from a connected device;
   obtaining filter criteria for the connected device;
   identifying portions of the payload satisfying the filter criteria;
   affecting audio of the audio content corresponding to the identified portions of the payload;
   after affecting the audio, reassembling the payload according to an internet-of-things (IOT) provider software development kit (SDK); and
   communicating the reassembled payload to an IOT provider service.

10. The method of claim 9, wherein the filter criteria comprise a code word for silencing subsequent utterances.

11. The method of claim 9, wherein the filter criteria comprise a word or phrase.

12. The method of claim 9, wherein the filter criteria comprise personally identifiable information (PII) data.

13. The method of claim 9, wherein the filter criteria comprise at least one voice sample of a voice to suppress.

14. A storage device having instructions stored thereon that when executed by a privacy filter device, direct the privacy filter device to:
- identify any devices on a network;
- assign a set of filter criteria for each device identified on the network;
- receive a payload comprising audio content;
- determine a source device of the payload;
- obtain filter criteria corresponding to the source device based on the set of filter criteria assigned to the source device; and
- apply the filter criteria to the payload.

15. The storage device of claim 14, wherein the set of filter criteria comprises whole network rules that apply to multiple devices and custom device rules that apply to a specified device.

16. The storage device of claim 14, wherein the source device is an unrecognized device, wherein the filter criteria comprise a total block setting that blocks a connected device from communicating to an internet-of-things (IOT) provider service, wherein the instructions to apply the filter criteria to the payload of the unrecognized device, direct the privacy filter device to block the payload.

17. The storage device of claim 14, further comprising instructions that direct the privacy filter device to:
- register a device identified on the network.

18. The storage device of claim 17, wherein the instructions to register the device direct the privacy filter device to exchange keys with the device.

19. The storage device of claim 14, wherein the instructions to apply the filter criteria to the payload direct the privacy filter device to:
- identify portions of the payload satisfying the filter criteria; and
- affect audio of the audio content corresponding to the identified portions of the payload.

20. The storage device of claim 14, further comprising instructions that direct the privacy filter device to:
- reassemble the payload according to an internet-of-things (IOT) provider software development kit (SDK); and
- communicate the reassembled payload to an IOT provider service.

* * * * *